United States Patent
Bunte et al.

(10) Patent No.: US 10,847,833 B2
(45) Date of Patent: Nov. 24, 2020

(54) GLASS-CERAMIC ELECTROLYTES FOR LITHIUM-SULFUR BATTERIES

(71) Applicants: Sion Power Corporation, Tucson, AZ (US); BASF SE, Ludwigshafen (DE); SCHOTT AG, Mainze (DE)

(72) Inventors: Christine Bunte, Mannheim (DE); Miriam Kunze, Saulheim (DE); Meike Schneider, Taunusstein (DE); Wolfgang Schmidbauer, Mainz-Finthen (DE)

(73) Assignees: Sion Power Corporation, Tucson, AZ (US); BASF SE, Ludwigshafen (DE); SCHOTT AG, Mainze (DE)

( * ) Notice: Subject to any disclaimer, the term of this patent is extended or adjusted under 35 U.S.C. 154(b) by 0 days.

(21) Appl. No.: 15/567,534

(22) PCT Filed: May 11, 2016

(86) PCT No.: PCT/EP2016/060561
§ 371 (c)(1),
(2) Date: Oct. 18, 2017

(87) PCT Pub. No.: WO2016/184750
PCT Pub. Date: Nov. 24, 2016

(65) Prior Publication Data
US 2018/0138542 A1    May 17, 2018

(30) Foreign Application Priority Data
May 21, 2015 (EP) .................................... 15168691

(51) Int. Cl.
*H01M 10/052*  (2010.01)
*H01M 2/14*   (2006.01)
(Continued)

(52) U.S. Cl.
CPC ......... *H01M 10/052* (2013.01); *H01M 2/145* (2013.01); *H01M 2/1646* (2013.01);
(Continued)

(58) Field of Classification Search
CPC .................................................... H01M 10/052
See application file for complete search history.

(56) References Cited

U.S. PATENT DOCUMENTS 5,648,187 A    7/1997  Skotheim
5,919,587 A    7/1999  Mukherjee et al.
(Continued)

FOREIGN PATENT DOCUMENTS

CN      103490027 A    1/2014
JP     2010-232085 A   10/2010
(Continued)

OTHER PUBLICATIONS

WO2010149265translation (Year: 2018).*
(Continued)

*Primary Examiner* — Brian R Ohara
(74) *Attorney, Agent, or Firm* — Wolf, Greenfield & Sacks, P.C.

(57) ABSTRACT

The present invention relates to a lithium-sulfur electrochemical cell comprising as component (A) an electrode comprising lithium metal or lithium alloy, and lithium ion conductively connected thereto as component (B) a glass ceramic membrane comprising an amorphous phase, as component (C) a liquid electrolyte comprising at least one solvent and at least one lithium salt, as component (D) an electrode comprising sulfur as a cathode active species. The present invention also relates to battery comprising a lithium-sulfur electrochemical cell as defined herein. The present invention further relates to the use of a glass ceramic membrane as defined herein as a separator in (i) a lithium-
(Continued)

sulfur electrochemical cell, or (ii) a battery comprising at least one lithium-sulfur electrochemical cell.

12 Claims, 1 Drawing Sheet

(51) Int. Cl.
*H01M 2/16* (2006.01)
*H01M 4/38* (2006.01)
*H01M 4/58* (2010.01)
*H01M 10/0568* (2010.01)
*H01M 10/0569* (2010.01)

(52) U.S. Cl.
CPC ............ *H01M 2/1673* (2013.01); *H01M 4/38* (2013.01); *H01M 4/382* (2013.01); *H01M 4/5815* (2013.01); *H01M 10/0568* (2013.01); *H01M 10/0569* (2013.01); *H01M 2220/20* (2013.01)

(56) References Cited

U.S. PATENT DOCUMENTS

| | | | |
|---|---|---|---|
| 5,961,672 A | 10/1999 | Skotheim et al. | |
| 6,225,002 B1* | 5/2001 | Nimon | H01M 10/0569 29/623.5 |
| 6,238,821 B1 | 5/2001 | Mukherjee et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,282,296 B2 | 10/2007 | Visco et al. | |
| 7,645,543 B2 | 1/2010 | Visco et al. | |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |
| 8,076,024 B2 | 12/2011 | Affinito et al. | |
| 8,084,102 B2 | 12/2011 | Affinito | |
| 8,087,309 B2 | 1/2012 | Kelley et al. | |
| 8,105,717 B2 | 1/2012 | Skotheim et al. | |
| 8,197,971 B2 | 6/2012 | Skotheim et al. | |
| 8,264,205 B2 | 9/2012 | Kopera | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,871,387 B2 | 10/2014 | Wang et al. | |
| 8,936,870 B2 | 1/2015 | Affinito et al. | |
| 8,968,928 B2 | 3/2015 | Wang et al. | |
| 9,005,311 B2 | 4/2015 | Safont et al. | |
| 9,005,809 B2 | 4/2015 | Wilkening et al. | |
| 9,034,421 B2 | 5/2015 | Mikhaylik et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,077,041 B2 | 7/2015 | Burnside et al. | |
| 9,105,938 B2 | 8/2015 | Scordilis-Kelley et al. | |
| 9,214,678 B2 | 12/2015 | Mikhaylik | |
| 9,397,342 B2 | 7/2016 | Skotheim et al. | |
| 9,419,274 B2 | 8/2016 | Wilkening et al. | |
| 9,490,478 B2 | 11/2016 | Mikhaylik et al. | |
| 9,531,009 B2 | 12/2016 | Kumaresan et al. | |
| 9,548,492 B2 | 1/2017 | Affinito et al. | |
| 9,559,348 B2 | 1/2017 | Kumaresan et al. | |
| 9,577,243 B2 | 2/2017 | Schmidt et al. | |
| 9,577,267 B2 | 2/2017 | Scordilis-Kelley et al. | |
| 9,653,735 B2 | 5/2017 | Skotheim et al. | |
| 9,653,750 B2 | 5/2017 | Laramie et al. | |
| 9,711,784 B2 | 7/2017 | Kelley et al. | |
| 9,728,768 B2 | 8/2017 | Mikhaylik et al. | |
| 9,735,411 B2 | 8/2017 | Viner et al. | |
| 9,742,028 B2 | 8/2017 | Zhou et al. | |
| 9,755,268 B2 | 9/2017 | Fleischmann et al. | |
| 9,780,404 B2 | 10/2017 | Scordilis-Kelley et al. | |
| 9,825,328 B2 | 11/2017 | Du et al. | |
| 2001/0038941 A1* | 11/2001 | Sunano | H01M 2/1673 429/66 |
| 2004/0191617 A1 | 9/2004 | Visco et al. | |
| 2005/0196672 A1 | 9/2005 | Mukherjee et al. | |
| 2006/0115579 A1 | 6/2006 | Mukherjee et al. | |
| 2007/0221265 A1 | 9/2007 | Affinito et al. | |
| 2008/0318128 A1 | 12/2008 | Simoneau et al. | |
| 2009/0035646 A1 | 2/2009 | Mikhaylik et al. | |
| 2009/0055110 A1 | 2/2009 | Kelley et al. | |
| 2010/0028782 A1* | 2/2010 | Inda | H01M 10/052 429/305 |
| 2010/0239914 A1 | 9/2010 | Mikhaylik et al. | |
| 2011/0006738 A1 | 1/2011 | Mikhaylik et al. | |
| 2011/0014524 A1 | 1/2011 | Skotheim et al. | |
| 2011/0053002 A1 | 3/2011 | Yamamura et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0177398 A1 | 7/2011 | Affinito et al. | |
| 2011/0206992 A1 | 8/2011 | Campbell et al. | |
| 2011/0256450 A1 | 10/2011 | Campbell et al. | |
| 2012/0048729 A1 | 3/2012 | Mikhaylik et al. | |
| 2012/0052339 A1 | 3/2012 | Mikhaylik et al. | |
| 2012/0052397 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2013/0164635 A1 | 6/2013 | Schmidt et al. | |
| 2013/0177821 A1 | 7/2013 | Tsuchida et al. | |
| 2013/0244085 A1 | 9/2013 | Coors et al. | |
| 2013/0244102 A1 | 9/2013 | Golodnitsky et al. | |
| 2013/0316072 A1 | 11/2013 | Scordilis-Kelley et al. | |
| 2013/0316218 A1* | 11/2013 | Dahlmann | H01M 2/145 429/144 |
| 2014/0057162 A1 | 2/2014 | Schneider et al. | |
| 2014/0062411 A1 | 3/2014 | Mikhaylik et al. | |
| 2014/0079994 A1 | 3/2014 | Affinito et al. | |
| 2014/0127419 A1 | 5/2014 | Fleischmann et al. | |
| 2014/0127577 A1 | 5/2014 | Fleischmann et al. | |
| 2014/0162138 A1* | 6/2014 | Fujiki | H01M 10/0562 429/322 |
| 2014/0186678 A1 | 7/2014 | Kim et al. | |
| 2014/0272565 A1 | 9/2014 | Gronwald et al. | |
| 2014/0272594 A1 | 9/2014 | Safont et al. | |
| 2014/0272595 A1 | 9/2014 | Cristadoro et al. | |
| 2014/0272597 A1 | 9/2014 | Mikhaylik et al. | |
| 2015/0010804 A1 | 1/2015 | Laramie et al. | |
| 2015/0044517 A1 | 2/2015 | Mikhaylik et al. | |
| 2015/0086837 A1 | 3/2015 | Laramie et al. | |
| 2015/0111104 A1 | 4/2015 | Engel et al. | |
| 2015/0162586 A1 | 6/2015 | Fleischmann et al. | |
| 2015/0180037 A1 | 6/2015 | Gronwald et al. | |
| 2015/0180084 A1 | 6/2015 | Scordilis-Kelley et al. | |
| 2015/0188194 A1 | 7/2015 | Mikhaylik et al. | |
| 2015/0236320 A1 | 8/2015 | Laramie et al. | |
| 2015/0236322 A1 | 8/2015 | Laramie et al. | |
| 2015/0280277 A1 | 10/2015 | Fleischmann et al. | |
| 2015/0287986 A1 | 10/2015 | Affinito et al. | |
| 2015/0287998 A1 | 10/2015 | Scordilis-Kelley et al. | |
| 2015/0318539 A1 | 11/2015 | Kelley et al. | |
| 2015/0349310 A1 | 12/2015 | Viner et al. | |
| 2016/0072132 A1 | 3/2016 | Liao et al. | |
| 2016/0118638 A1 | 4/2016 | Gronwald et al. | |
| 2016/0118651 A1 | 4/2016 | Kovalev et al. | |
| 2016/0149259 A1 | 5/2016 | Osada et al. | |
| 2016/0190640 A1* | 6/2016 | Visco | H01M 10/052 429/322 |
| 2016/0301080 A1 | 10/2016 | Skotheim et al. | |
| 2016/0329598 A1 | 11/2016 | Schneider et al. | |
| 2016/0344067 A1 | 11/2016 | Laramie et al. | |
| 2017/0018815 A1 | 1/2017 | Laramie et al. | |

(56) References Cited

U.S. PATENT DOCUMENTS

| | | |
|---|---|---|
| 2017/0047590 A1 | 2/2017 | Mikhaylik et al. |
| 2017/0141385 A1 | 5/2017 | Scordilis-Kelley et al. |
| 2017/0141402 A1 | 5/2017 | Affinito et al. |
| 2017/0141442 A1 | 5/2017 | Mikhaylik et al. |
| 2017/0149086 A1 | 5/2017 | Du et al. |
| 2017/0200975 A1 | 7/2017 | Liao et al. |
| 2017/0250390 A1 | 8/2017 | Laramie et al. |
| 2017/0288208 A1 | 10/2017 | Kelley et al. |
| 2017/0338475 A1 | 11/2017 | Laramie et al. |
| 2017/0352863 A1 | 12/2017 | Mikhaylik et al. |

FOREIGN PATENT DOCUMENTS

| | | | |
|---|---|---|---|
| JP | 2013-051127 A | 3/2013 | |
| JP | 2014-183021 A | 9/2014 | |
| WO | WO 2004/036669 A2 | 4/2004 | |
| WO | WO-2010149265 A1 * | 12/2010 | .......... H01M 2/1646 |
| WO | WO 2013/128759 A1 | 9/2013 | |
| WO | WO 2013/152030 A1 | 10/2013 | |

OTHER PUBLICATIONS

International Search Report and Written Opinion for PCT/EP2016/060561 dated Jun. 20, 2016.

Kai et al., New Generation of Li-ion battery technology. China National Defense Press. Aug. 2013:158-60.

\* cited by examiner

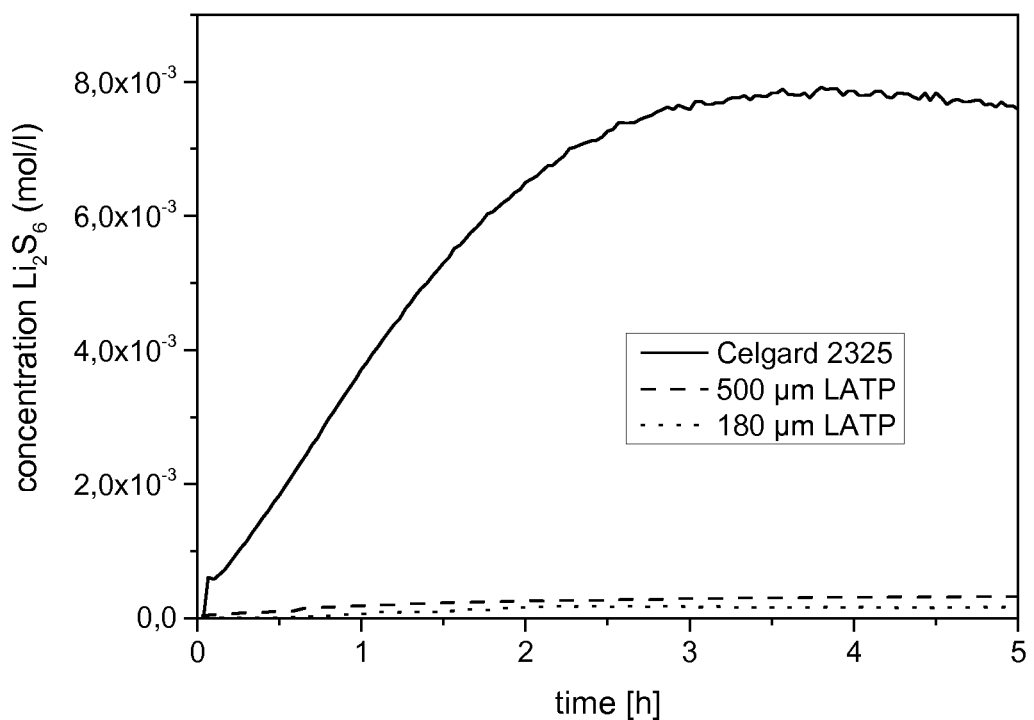

GLASS-CERAMIC ELECTROLYTES FOR LITHIUM-SULFUR BATTERIES

RELATED APPLICATIONS

This application is a U.S. National Stage patent application based on International Application PCT/EP2016/060561, filed May 11, 2016, which claims priority to European Patent Application 15168691.2, filed May 21, 2015, which are incorporated herein by reference in their entirety.

The present invention relates to a lithium-sulfur electrochemical cell comprising as component (A) an electrode comprising lithium metal or lithium alloy, and lithium ion conductively connected thereto as component (B) a glass ceramic membrane comprising an amorphous phase, as component (C) a liquid electrolyte comprising at least one solvent and at least one lithium salt, as component (D) an electrode comprising sulfur as a cathode active species.

The present invention also relates to battery comprising a lithium-sulfur electrochemical cell as defined herein. The present invention further relates to the use of a glass ceramic membrane as defined herein as a separator in (i) a lithium-sulfur electrochemical cell, or (ii) a battery comprising at least one lithium-sulfur electrochemical cell.

Rechargeable lithium-sulfur (Li/S) batteries are believed to be very promising alternative power sources for long driving range (>300 km) pure electric vehicles (PEV's) and plugin electric vehicles (PHEV) since current lithium-ion batteries (LIB) based on intercalation materials can potentially provide only energy densities up to 200 Wh kg$^{-1}$. This novel type of battery system offers much higher energy density and is relatively inexpensive. Theoretical energy density values can approach 2500 Wh kg$^{-1}$ with practical values of 500 to 600 Wh kg$^{-1}$ assuming the complete electrochemical conversion of sulfur ($S_8$) to lithium sulfide ($Li_2S$). Therefore, Li/S batteries have been investigated for mobile and portable applications, especially high energy applications.

Lithium as anode material offers several advantages over other materials due to its negative electrochemical potential and in combination with other materials its wide electrochemical window, its light weight and thus highest gravimetric energy density among all metallic anode materials. The active cathode material in lithium-sulfur batteries consists of sulfur. Concentration of sulfur in the cathode can vary between 30 to 80 wt %. Due to the electronically insulation properties of sulfur the presence of further additives is required. As conductive additives carbon (20-60 wt %) and in order to ensure the mechanical integrity of the cathode layer additional binders (1-10 wt %) are employed.

Currently quick capacity fading and low sulfur utilization are the main obstacles for using Li/S as rechargeable system. Only about 50% or ~800 mAhg$^{-1}$ of 1672 mAhg$^{-1}$ as theoretical capacity can be used. Reason is the "polysulfide shuttle" mechanism. The elemental sulfur molecules accept electrons during the first discharge process and are gradually converted from higher order to lower order polysulfides. Lower polysulfides with less than three sulfur atoms ($Li_2S_3$) are insoluble in the electrolyte so that the following reduction step to the insoluble and electronically non-conductive $Li_2S_2$ is hampered. Thus low discharge efficiencies are observed at rates higher than C/10. In addition, the polysulfides are not transformed to elemental sulfur during the charging cycles. Instead of being oxidized to sulfur in the final step, the higher order polysulfides constantly diffuse to the anode where they are being gradually reduced by the elemental lithium to lower polysulfides in a parasitic reaction. The soluble lower polysulfides then diffuse back to the cathode thus establishing the "polysulfide shuttle". Insoluble lower polysulfides precipitate from the electrolyte and accumulate on the anode side. In summary, the mechanism reduces charge efficiency and causes corrosion on anode and cathode. As result Li/S batteries suffer from capacity fading and a lack of cycle lifetime. Typical state of the art Li/S battery systems can reach lifetimes of 50-80 cycles.

It was therefore an object of the present invention to provide a lithium-sulfur electrochemical cell showing improved capacity and cycle lifetime. This object is achieved by a lithium-sulfur electrochemical cell as described herein.

In a first aspect, the present invention therefore relates to a lithium-sulfur electrochemical cell comprising
as component (A) an electrode comprising lithium metal or lithium alloy,
and lithium ion conductively connected thereto
as component (B) a nanoporous glass ceramic membrane comprising an amorphous phase,
as component (C) a liquid electrolyte comprising at least one solvent and at least one lithium salt,
as component (D) an electrode comprising sulfur as a cathode active species.

Surprisingly it has been found that glass ceramic membranes comprising an amorphous phase provide good blocking of polysulfides and lithium dendrites. Without wishing to be bound to any theory, it is believed that in glass ceramics comprising an amorphous phase, the pores in between the ceramic crystals are closed. A nanoporous glass ceramic membrane comprising an amorphous phase for use according to the present invention can be prepared as described e.g. in DE 10 2011 013 018 B and in DE 10 2014 100 684.

In comparison, ceramics prepared by standard sintering have a remaining porosity that results in rapid growth of lithium dendrites and subsequent cell shorting. Such ceramics can only be used as very thick membranes, which will add strongly to cell polarization. Alternatively, the pores have to be blocked in an additional step, for example by polymer resin infusion. In comparison, the expedient melt synthesis by SCHOTT yields ceramics with intrinsic high density that can also be used as very thin films, e.g. down to 180 μm.

As used herein, a "nanoporous" glass ceramic membrane consists of a regular framework supporting a regular, porous structure. The average size of the pores is generally 100 nanometers or smaller.

An "amorphous phase" is a non-crystalline phase that lacks the long-range order characteristic of a crystal phase.

According to the present invention it is preferred that in the lithium-sulfur electrochemical cell as described herein, the amorphous phase accounts for 5 to 40 vol-%, more preferably 5 to 30 vol-%, most preferably 10 to 25 vol-% of component (B).

According to the present invention it is also preferred that in the lithium-sulfur electrochemical cell as described herein, component (B) has an average porosity of 40 vol-% or less, more preferably 30 vol-% or less, even more preferably 20 vol-% or less, most preferably 5 vol-% or less, and/or that component (B) has a porosity of at least 1 vol-%.

Average porosity can be measured, for example, using a mercury porosimeter. Briefly, average porosity can be determined by measuring the external pressure required to force a liquid (e.g., mercury) into a pore (e.g., against the opposing force of surface tension between the liquid and the pore).

Those skilled in the art would be capable of selecting an appropriate range of external pressures based upon the particles selected.

As mentioned before, the expedient melt synthesis by SCHOTT yields ceramics with intrinsic high density that can also be used as very thin films.

According to the present invention it is therefore preferred that in the lithium-sulfur electrochemical cell as described herein, component (B) has an average thickness of 500 µm or less, more preferably 400 µm or less, even more preferably 200 µm or less, further even more preferably 100 µm or less, most preferably 50 µm or less.

According to the present invention it is preferred that in the lithium-sulfur electrochemical cell as described herein, component (B) fulfils one or more of the following criteria:
- it comprises one or more metals selected from the group consisting of Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg, Al, Ga, In, Tl, Si, Ge, Sn, Pb;
- its surface is either positively or negatively charged when in contact with component (C);
- it is capable of releasing cations when in contact with component (C), the cations being solvatized at the surface of component (B) by the solvent of component (C);
- it is capable of coordinating to lithium ions via oxygen atoms.

In the lithium-sulfur electrochemical cell as described herein, the electrolyte may comprise one or more ionic electrolyte salts to provide ionic conductivity and one or more liquid electrolyte solvents, gel polymer materials, or polymer materials. Preferred non-aqueous electrolytes include organic electrolytes comprising one or more materials selected from the group consisting of liquid electrolytes, gel polymer electrolytes, and solid polymer electrolytes.

Non-aqueous liquid electrolyte solvents include, but are not limited to, non-aqueous organic solvents, which are preferably selected from the group consisting of N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Preferred acyclic ethers are selected from the group consisting of diethyl ether, dipropyl ether, dibutyl ether, dimethoxymethane, trimethoxymethane, dimethoxyethane, diethoxyethane, 1,2-dimethoxypropane, and 1,3-dimethoxypropane. Preferred cyclic ethers are selected from the group consisting of tetrahydrofuran, tetrahydropyran, 2-methyltetrahydrofuran, 1,4-dioxane, 1,3-dioxolane, and trioxane. Preferred polyethers are selected from the group consisting of diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Preferred sulfones are selected from the group consisting of sulfolane, 3-methyl sulfolane, and 3-sulfolene. Fluorinated derivatives of the foregoing may also be used as liquid electrolyte solvents. Mixtures of the solvents described herein can also be used.

Preferred mixtures of solvents are selected from 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures preferably vary from about 5:95 to 95:5.

Preferred gel polymer electrolytes are selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing.

Preferred solid polymer electrolytes are selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

According to the present invention it is preferred that in the lithium-sulfur electrochemical cell as described herein, the at least one lithium salt of component (C) is selected from the group consisting of $LiNO_3$, $LiPF_6$, $LiBF_4$, $LiClO_4$, $LiAsF_6$, $Li_2SiF_6$, $LiSbF_6$, $LiAlCl_4$, lithium bis-oxalatoborate, $LiCF_3SO_3$, $LiN(SO_2F)_2$, $LiC(C_nF_{2n+1}SO_2)_3$, wherein n is an integer in the range of from 1 to 20, and $(C_nF_{2n+1}SO_2)_m XLi$ with n being an integer in the range of from 1 to 20, m being 1 when X is selected from oxygen or sulfur, m being 2 when X is selected from nitrogen or phosphorus, and m being 3 when X is selected from carbon or silicon.

According to the present invention it is also preferred that in the lithium-sulfur electrochemical cell as described herein, component (D) comprises elemental sulfur as electroactive material.

"Electroactive sulfur-containing materials," as used herein, relates to cathode active materials which comprise the element sulfur in any form, wherein the electrochemical activity involves the breaking or forming of sulfur-sulfur covalent bonds. Preferred electroactive sulfur-containing materials are selected from elemental sulfur and organic materials comprising sulfur atoms and carbon atoms, which may or may not be polymeric. Organic materials include those further comprising heteroatoms, conductive polymer segments, composites, and conductive polymers.

Preferably, the sulfur-containing material, in its reduced form, comprises a polysulfide moiety, Sm, selected from the group consisting of covalent Sm moieties, ionic Sm moieties, and ionic $Sm^{2-}$ moieties, wherein m is an integer equal to or greater than 3. Preferably, m of the polysulfide moiety Sm of the sulfur-containing polymer is an integer equal to or greater than 6. More preferably, m of the polysulfide moiety Sm of the sulfur-containing polymer is an integer equal to or greater than 8. In a preferred aspect of the present invention, the sulfur-containing material is a sulfur-containing polymer. In another preferred aspect of the present invention, the sulfur-containing polymer has a polymer backbone chain and the polysulfide moiety Sm is covalently bonded by one or both of its terminal sulfur atoms as a side group to the polymer backbone chain. In yet another preferred aspect of the present invention, the sulfur-containing polymer has a polymer backbone chain and the polysulfide moiety Sm is incorporated into the polymer backbone chain by covalent bonding of the terminal sulfur atoms of the polysulfide moiety.

Preferably, the electroactive sulfur-containing material comprises more than 50% by weight of sulfur. More preferably, the electroactive sulfur-containing material comprises more than 75% by weight of sulfur. Most preferably, the electroactive sulfur-containing material comprises more than 90% by weight of sulfur.

The nature of the electroactive sulfur-containing materials useful in the practice of this invention may vary widely, as known in the art. In a preferred aspect of the present invention, the electroactive sulfur-containing material comprises elemental sulfur. In another preferred aspect of the present invention, the electroactive sulfur-containing material comprises a mixture of elemental sulfur and a sulfur-containing polymer.

According to the present invention it is preferred that the lithium-sulfur electrochemical cell as described herein further comprises as component (E) a current collector contacting component (A).

Materials for the current collector are preferably selected from metals (e.g., copper, nickel, aluminum, passivated metals, and other appropriate metals); metallized polymers; electrically conductive polymers; polymers including conductive particles dispersed therein; and other appropriate materials. In a preferred aspect of the present invention, the current collector is deposited onto the electrode layer using physical vapor deposition, chemical vapor deposition, electrochemical deposition, sputtering, doctor blading, flash evaporation, or any other appropriate deposition technique for the selected material. Alternatively, the current collector might be formed separately and bonded to the electrode structure.

According to the present invention it is preferred that the lithium-sulfur electrochemical cell as described herein further comprises as component (F) a carrier substrate contacting component (A) or contacting component (E).

The carrier substrate may be made from a polymeric material. For example, the carrier substrate may comprise a polyester such as a polyethylene terephthalate (PET) (e.g., optical grade polyethylene terephthalate), polyolefins such as polypropylene and polyethylene (which may optionally be metalized), nylon, polyvinyl chloride, polyvinyl alcohol. Also, the carrier substrate may comprise a metal or a ceramic material.

According to the present invention it is preferred that in the lithium-sulfur electrochemical cell as described herein the carrier substrate is selected from the group consisting of polymer films, metalized polymer films, ceramic films and metal films.

In another aspect, the present invention relates to a battery comprising at least one lithium-sulfur electrochemical cell as described herein.

In a further aspect, the present invention relates to the use of a glass ceramic membrane as defined herein as separator in (i) a lithium-sulfur electrochemical cell, or (ii) a battery comprising at least one lithium-sulfur electrochemical cell.

The present invention will be further described by the following non-limiting examples.

Preparation of Nanoporous Glass Ceramic Membranes Comprising an Amorphous Phase:

Li1.6Al0.5Ti0.95Ta0.5(PO3)4 (LATTP) glass ceramic was prepared by induction melting of raw materials in a quartz crucible at 1500° C.-1650° C. in air, as described previously in U.S. 2014/0057162. The raw material composition (in weight %) is as follows: 5.4% Al2O3 (source: Al(PO3)3), 5.2% Li2O (source: LiH2PO4), 45.9% P2O5 (including LiH2PO4 and Al(PO3)3), 3.9% SiO2, 23.2% Ta2O5 and 16.4% TiO2. The melt was cast onto a metal plate forming glassy plates of 3 mm- 8 mm in thickness and 30 mm-40 mm in diameter. Some of the glass was poured on a twin roller device to produce glass ribbons for powder production. The glass samples were annealed just below the glass transition temperature at 530° C. and slowly cooled to room temperature (rate 20° C./h). The resulting glass samples were dark, violet, with spontaneous crystallization occurring in few spots. Nucleation and crystallization temperatures were determined by differential thermal analysis and accordingly samples were annealed at 850-950° C. for 12 hours and slowly cooled to room temperature to form the glass ceramic used for our experiments. The main phase has a NASICON structure with nominal composition of Li1.6Al0.5Ti0.95Ta0.5(PO3)4, isostructural to LiGe2(PO4)3 and LiTi2(PO4)3. SiO2 (Cristobalite), observed as an impurity phase (<2% by weight) in the XRD spectrum, is possibly formed during the heat treatment step.

For the preparation of Ta-doped Li7La3Zr2O12 (LLZO) glass ceramic, technical grade raw materials were mixed in the following proportions (in weight %): 13.9% Li2O, 53.6% La2O3, 20.3% ZrO2 and 12.1% Ta2O5. Since this composition is highly corrosive, skull melting technology, was used. This technique uses a water cooled crucible (skull crucible) leading to the formation of a barrier layer of solidified melt between crucible and melt. The batch was preheated using a gas burner, then melted using high frequency induction heating. After stirring and homogenizing the melt, the induction heating was switched off, allowing the melt to cool slowly to room temperature. The resulting material was white to slightly yellow colored and highly crystalline with 100% cubic garnet crystalline phase (as determined by XRD). No impurity phases were detected. Bulk samples and powder material were prepared from the crystallized ingot using water-free preparation methods.

Polysulfide Shuttle:

The solid ion conductor is integrated in the Li/S battery set up as a separator between anode and cathode avoiding shot circuits but allows the transport of lithium ions during charging and discharging. The membrane itself is 180 μm thick made of LATTP glass ceramic. No binder or other conducting polymers are present within the used membrane.

Cell Setup:

Anode: Lithium metal

Liquid electrolyte: triethylene glycol dimethyl ether with 1M LiTFSI

Separation: LATTP-membrane

Cathode: sulfur-carbon

No further additive like e.g. LiNO3 was used in the electrolyte to block the polysulfide shuttle.

Results:

The Li/S cell was cycled with different current densities varied from 0.6 mA/cm$^2$ up to 4 mA/cm$^2$ in a voltage range from 1.8 V to 2.8 V. About 150 cycles (1 cycle is a charging and a discharging step) can be reached with this setup and increasing current densities. The solid ion conducting membrane is suppressing the polysulfide shuttle otherwise the cell would have been dead after 1-2 cycles.

Polysulfide Permeation:

Permeability of the membranes for polysulfides was also tested ex situ with a U-bend type diffusion setup.

Setup:

For diffusion measurements, the ceramic pellets were placed with the aid of a Teflon seal between two glass tubes (17 mm inner diameter) with attached glass joints. The tubes were fixed with a clamp. A glass cap with three additional joints was mounted on top of each of the tubes. The setup was purged with nitrogen. Through a septum, one tube was filled with a polysulfide solution (0.05 M Li2S6 in DOL/DME), the other with DOL/DME. Permeation of polysulfides into the solvents was followed optically and with a designated UV probe (measurement wavelength was 380 nm, $\varepsilon$=158 m$^2$/mol).

Results:

FIG. 1 shows the increase in polysulfide concentration with time for a) a polyolefin separator as a classical example of a porous membrane, b) a 500 μm thick LATP membrane and c) a 180 μm LATP membrane. It is clearly visible that the ceramic membrane is much less permeable to polysulfides than the porous material, and that permeation through LATP is independent of membrane thickness.

Preparation of Sintered Ceramics (Comparative Example):

Li7La3Zr1.75Nb0.25O12 ceramic pellets were prepared by the following process:

1. LiOH, La2O3, ZrO2 and Nb2O5 were mixed using ball milling with the right stoichiometry according to the upper formula.
2. The mixed powders were pressed into pellets and synthesized at 1100° C. for 12 hours.
3. The synthesized pellets were ground into powder and ball milled for 24 hours in IPA for size reduction.
4. Then the powders were dried and pressed into 1 inch diameter pellets and sintered at 1140° C. for 12-24 hrs.
5. The sintered pellets were polished from both sides into 1 mm thickness. They were submitted for compositional, density and Li—Li cycling analysis. Hg intrusion porosimetry (up to 35,000 psi) measurements showed the density was >99.9% of theoretical density.

Li—Li cell was built by placing Lithium foil of slightly smaller diameter than the pellet (⅞" Li foil and 1" pellet) on each side. The stack was placed in a clamping test kit and a pressure of 10 kg/cm$^2$ was applied and maintained during the testing. The cycling was done at the rate of 0.01 mA/cm$^2$. After a couple of cycles, dendrite formation was observed (sudden drop of voltage from up to ±0.5 V down to 1 mV).

The invention claimed is:

1. A lithium-sulfur electrochemical cell, comprising:
   as component (A), an electrode comprising lithium metal or lithium alloy, and a lithium ion that is conductively connected to the electrode;
   as component (B), a nanoporous glass ceramic membrane comprising an amorphous phase, wherein the amorphous phase accounts for 5 to 40 vol-% of component (B);
   as component (C), a liquid electrolyte comprising at least one solvent and at least one lithium salt; and
   as component (D), an electrode comprising sulfur as a cathode active species;
   wherein component (B) comprises one or more metals chosen from Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg, Al, Ga, In, Tl, Ge, Sn, and Pb.

2. The lithium-sulfur electrochemical cell according to claim 1, wherein component (B) has an average porosity of 40 vol-% or less, and/or wherein component (B) has a porosity of at least 1 vol-%.

3. The lithium-sulfur electrochemical cell according to claim 1, wherein component (B) has an average thickness of 500 μm or less.

4. The lithium-sulfur electrochemical cell according to claim 1, wherein a surface of component (B) is either positively or negatively charged when in contact with component (C).

5. The lithium-sulfur electrochemical cell according to claim 1, wherein component (B) is capable of releasing cations when in contact with component (C), the cations being solvatized at a surface of component (B) by the solvent of component (C).

6. The lithium-sulfur electrochemical cell according to claim 1, wherein component (B) is capable of coordinating to lithium ions via oxygen atoms.

7. The lithium-sulfur electrochemical cell according to claim 1, wherein the at least one lithium salt of component (C) is selected from the group consisting of LiNO$_3$, LiPF$_6$, LiBF$_4$, LiClO$_4$, LiAsF$_6$, Li$_2$SiF$_6$, LiSbF$_6$, LiAlCl$_4$, lithium bis-oxalatoborate, LiCF$_3$SO$_3$, LiN(SO$_2$F)$_2$, LiC(C$_n$F$_{2n+1}$SO$_2$)$_3$, wherein n is an integer in the range of from 1 to 20, and (C$_n$F$_{2n+1}$SO$_2$)$_m$XLi with n being an integer in the range of from 1 to 20, m being 1 when X is selected from oxygen or sulfur, m being 2 when X is selected from nitrogen or phosphorus, and m being 3 when X is selected from carbon or silicon.

8. The lithium-sulfur electrochemical cell according to claim 1, wherein component (D) comprises elemental sulfur as the cathode active species.

9. The lithium-sulfur electrochemical cell according to claim 1, further comprising as component (E) a current collector contacting component (A).

10. The lithium-sulfur electrochemical cell according to claim 9, further comprising as component (F) a carrier substrate contacting component (A) or contacting component (E).

11. The lithium-sulfur electrochemical cell according to claim 10, wherein the carrier substrate is selected from the group consisting of polymer films, metalized polymer films, ceramic films and metal films.

12. A battery comprising at least one lithium-sulfur electrochemical cell according to claim 1.

* * * * *